United States Patent
Ashrafi

(10) Patent No.: US 10,837,761 B1
(45) Date of Patent: Nov. 17, 2020

(54) COMPONENT HEATING SUB-SYSTEMS AND METHODS FOR LASER SHEAROGRAPHY TESTING SYSTEMS

(71) Applicant: THE BOEING COMPANY, Chicago, IL (US)

(72) Inventor: Mahdi Ashrafi, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/398,379

(22) Filed: Apr. 30, 2019

(51) Int. Cl.
*G01B 11/00* (2006.01)
*G01B 11/16* (2006.01)
*G01B 9/02* (2006.01)

(52) U.S. Cl.
CPC ........ *G01B 11/162* (2013.01); *G01B 9/02095* (2013.01)

(58) Field of Classification Search
CPC .......................... G01B 11/162; G01B 9/02095
USPC ........................................................ 73/800
See application file for complete search history.

(56) References Cited

U.S. PATENT DOCUMENTS

| 6,717,681 B1 | 4/2004 | Bard et al. | |
| 8,804,132 B1* | 8/2014 | Saxer ................. | G01B 9/02098 356/520 |
| 2004/0136761 A1* | 7/2004 | Asakura ................. | H05B 6/145 399/328 |
| 2011/0142091 A1 | 6/2011 | Wardle | |
| 2013/0235897 A1* | 9/2013 | Bouteyre ................. | F03D 1/065 374/4 |
| 2014/0033799 A1* | 2/2014 | Newman ................... | G01B 9/02 73/37 |

OTHER PUBLICATIONS

"What is Laser Shearography", https://www.dantecdynamics.com/products-and-services/what-is-laser-shearography.
"A new technique to detect defect size and depth in composite structures using digital shearography and unconstrained optimization", https://www.sciencedirect.com/science/article/pii/S096386951100096X.
"Nondestructive evaluation of aircraft fuselage panels with electronic shearography", Oct. 22, 1993, https://www.spiedigitallibrary.org/conference-proceedings-of-spie/2066/1/Nondestructive-evaluation-of-aircraft-fuselage-panels-with-electronic-shearography/10.1117/12.162110.full.
Lopez-Alverex Y F, et al: "Implementation of Optical Shearography for Electronic Devices Analysis," 2018 15th International Conference on Electrical Engineering, Computing Science and Automatic Control (CCE), IEEE, 5 Sep. 2018, pp. 1-5.
Igor Kryukov, et al: "Prospects and limitations of eddy current shearography for non-desctuctive testing of adhesively bonded structural joints," the Journal of Adhesion, vol. 95, No. 9, pp. 874-886, Mar. 20, 2018.

(Continued)

*Primary Examiner* — Max H Noori
(74) *Attorney, Agent, or Firm* — The Small Patent Law Group LLC; Joseph M. Butscher

(57) ABSTRACT

A laser shearography testing system for non-destructively testing a component includes a component heating sub-system coupled to the component. The component heating sub-system excites the component into a loaded state by passing an electric current through the component. A resistivity of the component causes the component to internally and uniformly heat as the electric current passes through the component.

20 Claims, 2 Drawing Sheets

(56) References Cited

OTHER PUBLICATIONS

Anisimov Andrei G, et al. "Strain characterization of embedded aerospace smart materials using shearography," Proceedings of SPIE, IEEE, US, vol. 9435, p. 2, paragraph 2-p. 6, line 5.4; figures 1-8, Apr. 3, 2015.
F. Pinto, et al, "aterial enabled thermography," NDT & E International, vol. 67, pp. 1-9, Oct. 1, 2014.
Extended European Search Report for EP 20160529.2-1001, dated Sep. 17, 2020.

* cited by examiner

COMPONENT HEATING SUB-SYSTEMS AND METHODS FOR LASER SHEAROGRAPHY TESTING SYSTEMS

FIELD OF THE DISCLOSURE

Embodiments of the present disclosure generally relate to laser shearography testing systems, and more particularly to systems and methods for heating components being tested by laser shearography testing systems.

BACKGROUND OF THE DISCLOSURE

Laser shearography is an optical interferometric technique that is used to detect irregularities of an object under test. In general, irregularities within an object cause local changes in a surface profile when the object under test is subjected to a change in an applied load, such as a change in temperature. Typically, a load change may be caused by a change in temperature, pressure, vibration or electromagnetic energy. Changes in surface profile may reveal various irregularities such as disbonds, delaminations, core irregularities, and the like.

Laser shearography is used in relation to non-destructive testing (NDT) and quality control applications, such as with respect to composite and metallic materials. Typically, during laser shearography inspection, an object under test is stressed or excited, such as through heating.

During laser shearography testing, a test object is interferometrically compared in relation to two states, namely, a neutral state and a loaded state. Advanced software algorithms perform live image processing to identify variations in out-of-plane deformations between the two states, which in turn reveals surface or sub-surface discontinuities or anomalies by highlighting local weaknesses under certain load conditions. Excitation methods such as heating, vacuum, and vibration are currently used to provide the loaded state.

A known excitation method includes using a separate and distinct heater, such as a heat lamp or heat blankets, to heat the surface of the object being tested. As the heater emits heat energy onto a surface of the object, a temperature of an opposite surface (as well as internal portions) differs from that on the surface of the object. That is, the surface heating of the object causes temperature gradients on and within the object. In general, the object is unevenly heated by the heater. As such, the loaded state may not accurately reflect characteristics of the entirety of the object. Further, the object may be susceptible to being damaged through surface heating, as excessive heating may be needed to adequately heat the entirety of the object.

SUMMARY OF THE DISCLOSURE

A need exists for a system and a method for uniformly and safely heating an object during a laser shearography test. Further, a need exists for a system and a method for heating an object that reduce a potential of damage to the object during a laser shearography test. Further, a need exists for a system and a method that increase detection probability of far field irregularities by providing uniform excitation across an inspected part.

With those needs in mind, certain embodiments of the present disclosure provide a laser shearography testing system for non-destructively testing a component. The laser shearography testing system includes a component heating sub-system coupled to the component. The component heating sub-system excites the component into a loaded state by passing an electric current through the component. Resistivity of the component causes the component to internally and uniformly heat as the electric current passes through the component.

In at least one embodiment, the laser shearography testing system includes a laser-emitting device that is configured to emit a laser beam onto the component. In at least one embodiment, the laser beam emitted by the laser-emitting device passes through a beam expander before impinging on the component. A camera acquires at least one first image of the component in a neutral state, in which the component is not excited by the component heating sub-system, and at least one second image of the component in the loaded state. An image shearing device may be disposed between the component and the camera.

In at least one embodiment, the component heating sub-system includes a power source coupled to the component. For example, a first lead extends from the power source and couples to a first portion of the component, and a second lead extends from a second portion of the component and couples to the power source.

In at least one embodiment, the component heating sub-system includes a heating control unit that is operatively coupled to a power source. The heating control unit selectively activates the power source in order to selectively pass the electric current through the component.

In at least one embodiment, the component heating sub-system includes one or more heat sensors coupled to the component. The heat sensor(s) may be mounted on an outer surface of the component, and/or embedded within the component.

Certain embodiments of the present disclosure provide a laser shearography testing method for non-destructively testing a component, according to an embodiment of the present disclosure. The laser shearography testing method includes coupling a component heating sub-system to a component, exciting the component into a loaded state with the component heating sub-system (wherein the exciting includes passing an electric current through the component), and internally and uniformly heating the component through the exciting due to a resistivity of the component.

In at least one embodiment, the laser shearography testing method includes emitting a laser beam onto the component by a laser-emitting device, passing the laser beam emitted by the laser-emitting device through a beam expander before impinging on the component, acquiring at least one first image of the component in a neutral state in which the component is not excited by the component heating sub-system, and acquiring at least one second image of the component in the loaded state.

In at least one embodiment, the coupling includes coupling a power source to the component. For example, the coupling includes extending a first lead from the power source to a first portion of the component, and extending a second lead from a second portion of the component to the power source.

In at least one embodiment, the laser shearography testing method includes operatively coupling a heating control unit to a power source, communicatively coupling one or more heat sensors coupled to the component with the heating control unit, and selectively activating the power source in order to selectively pass the electric current through the component.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a component heating sub-system and method for a laser shearography testing system in which a component (such as a carbon fiber reinforced polymer, composite structure, metallic structure, and/or the like) is resistively heated. In particular, the component under test is coupled to a power source, which generates electricity that is passed through the component. As an electrical current passes through the component, the resistivity of the component causes the temperature of the component to increase (that is, the component is heated). The component is internally and uniformly heated via the current passing therethrough. In at least one embodiment, a heating control unit operates the power source to control the electrical current passing through the component, and therefore the heating of the component. Embodiments of the present disclosure significantly reduce temperature gradients within the component, as the component is uniformly and internally heated, in stark contrast to prior known systems that use separate heaters to heat outer surfaces of components.

Embodiments of the present disclosure provide component heating sub-systems and methods for laser shearography testing systems that use resistivity of a component under test to apply thermal excitation of the component. As an electric current is passed through the component, the resistivity of the component causes the component to internally and uniformly heat, thereby providing uniform excitation across a thickness of the component. Unlike prior systems, the heating systems described by embodiments of the present disclosure are light, portable, and easy to set up.

In at least one embodiment, external heating (such as through a separate and distinct heat lamp, heat blanket(s), or the like) may also be used. That is, in at least one embodiment, the component may be internally heated, as described herein, as well as heated via one or more external heating devices.

Figure 1:
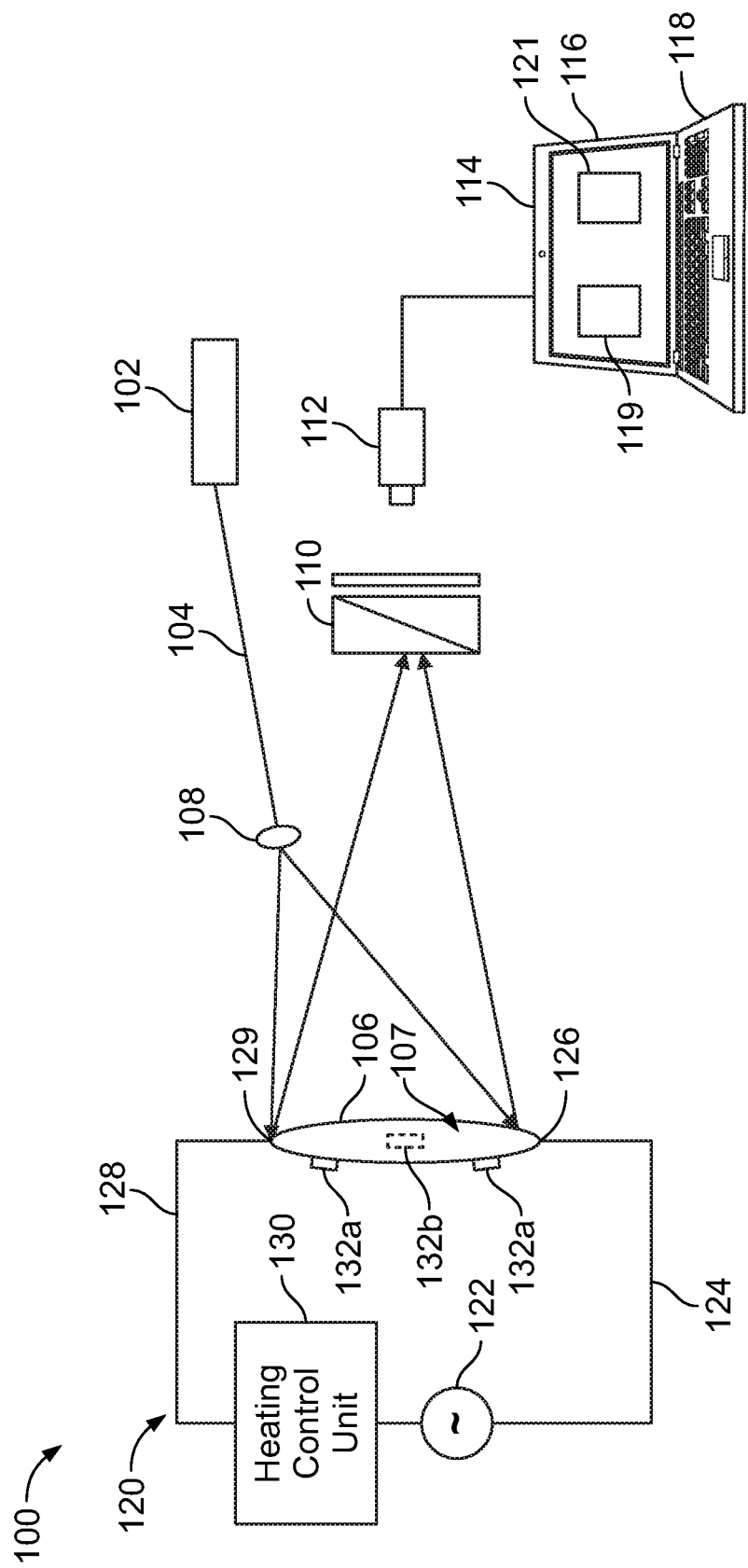
FIG. 1 illustrates a schematic diagram of a laser shearography testing system, according to an embodiment of the present disclosure.

FIG. 1 illustrates a schematic diagram of a laser shearography testing system 100, according to an embodiment of the present disclosure. The laser shearography testing system 100 includes a laser-emitting device 102 that is configured to emit a laser beam 104 towards a component 106 being tested. The component 106 may be a metallic structure, a composite structure, and/or the like. In at least one embodiment, the component is a carbon fiber reinforced polymer. In at least one embodiment, the component 106 is a composite panel, such as may be used to form a portion of an internal cabin, a fuselage, or the like of an aircraft. In at least one other embodiment, the component 106 may be used with respect to various other structures, systems, and the like, such as wind turbine blades, parts for vehicles, and/or the like.

In an exemplary embodiment, the emitted laser beam 104 passes through a beam expander 108, such as one or more lenses, before impinging on the component 106. An image shearing device 110 is disposed between the component 106 and a camera 112, such as a digital camera. The camera 112 detects images of the laser energy impacting the component 106 being tested, such as during a neutral state, when the component 106 is not excited, and a loaded state, when the component 106 is excited via heat energy, vibration energy, a vacuum, and/or the like. As used herein, the term excited means at least certain atomic structures being in a state of increased energy as compared to the non-excited, neutral state. Image data acquired by the camera 112 is received by a workstation 114, such as a computer, a handheld smart device, or the like, which includes a monitor 116 and a user input device 118, such as a keyboard, mouse, touchscreen interface, or the like.

In order to transition the component 106 from the neutral state to the loaded state, the laser shearography testing system 100 includes a component heating sub-system 120. The component heating sub-system 120 is coupled to the component 106 and is configured to excite the component 106 into a loaded state by heating the component 106. In particular, the component heating sub-system 120 generates electricity, which passes through the component 106. The resistivity of the component 106 causes an internal region 107 of the component to be uniformly heated (that is, increase in temperature) as the electricity (for example, the electric current) passes through the component 106.

As described herein, the laser shearography testing system 100 for non-destructively testing the component 106 includes the component heating sub-system 120 coupled to the component 106. The component heating sub-system 120 excites the component 106 into a loaded state by passing an electric current through the component 106. The resistivity of the component 106 causes the component 106 to heat (that is, increase in temperature) as the electric current passes through the component 106.

In at least one embodiment, the component heating sub-system 120 includes a power source 122 that is coupled to the component 106. The power source 122 may provide a direct or alternating current, such as may be provided via a battery, a standard electrical outlet, and/or the like. The power source 122 is configured to generate electricity. The power source 122 is activated to generate an electric current that passes through the component 106. As the electric current passes through the component 106, the resistivity of the component 106 causes the component 106 to internally and uniformly heat, in contrast to being surface heated by a separate and distinct heater. That is, the resistivity of the component 106 itself is used to excite the component 106 (via heating) to the loaded state as the current generated by the power source 122 passes through the component 106.

In at least one embodiment, a first lead 124 extends from the power source 122 and couples to a first end 126 of the component 106. A second lead 128 extends from a second end 129, which is opposite from the first end 126, and couples to the power source 122. As such, the electrical current generated by the power source 122 passes through an entire length of the component 106 from the first end 126 to the second end 129. Optionally, the first lead 124 may couple to a first side of the component 106, and the second lead 128 may couple to a second side, opposite from the first side, of the component 106. In at least one other embodiment, the first lead 124 and the second lead 128 may couple to other portions of the component 106. For example, the first lead 124 may couple to an end of the component 106, and the second lead 128 may couple to a side of the component 106, or vice versa.

In at least one embodiment, the component heating sub-system 120 includes a heating control unit 130 that is operatively coupled to the power source 122, such as through one or more wired or wireless connections. The heating control unit 130 activates and deactivates the power source 122 in order to selectively pass the current through the component 106, thereby selectively heating the component 106. In at least one embodiment, the heating control unit 130 may be used to control an intensity of the electric current passing through the component 106, thereby controlling a degree of heating of the component 106. For example, with increased electric current, the heating of the component 106 increases. Conversely, with decreased electric current, the heating of the component 106 decreases.

In at least one embodiment, one or more heat sensors 132 are coupled to the component 106. The heat sensors 132 may be or include thermometers, thermocouples, thermostats, and/or the like. In at least one embodiment, the heat sensors 132 are mounted on an outer surface of the component 106, and/or embedded within the component 106. For example, the heat sensors 132a are mounted on outer surfaces of the component 106, while the heat sensor 132b is embedded within the component 106.

The heat sensors 132 are in communication with the heating control unit 130, such as through one or more wired or wireless connections. The heat sensors 132 output heat signals indicative of the temperature of the component 106 to the heating control unit 130. The heating control unit 130 monitors the heat signals, and controls the power source 122 accordingly. For example, based on the temperature of the component 106 as detected through the heating signals output by the heat sensors 132, the heating control unit 130 operates the power source 122 to adjust the temperature of the component 106, based on a desired target temperature for the component 106.

Optionally, the component heating sub-system 120 may not include heat sensors 132. Also, optionally, the component heating sub-system 120 may not include the heating control unit 130. In at least one embodiment, the component heating sub-system 120 may not include either the heating control unit 130 or the heat sensor(s) 132.

In at least one embodiment, the laser shearography testing system 100 is devoid of a separate and distinct heater. The component heating sub-system 120 is devoid of a surface heater, such as a heat lamp.

In operation, the component 106 is first monitored by the camera 112 in the neutral state. That is, the component 106 is not excited by the component heating sub-system 120 in the neutral state. The laser-emitting device 102 emits the laser beam 104 onto the component 106 in the neutral state, and the camera 112 acquires one or more images of the laser energy interacting with the component 106 in the neutral state.

After images of the component 106 in the neutral state are acquired, the component heating sub-system 120 excites the component 106 into the loaded state. In particular, the power source 122 generates an electric current that passes through the component 106. The resistivity of the component 106 causes the component 106 to heat as the electric current passes therethrough. The heating control unit 130 may control an output of the power source 122, thereby controlling the temperature of the component 106 in order to provide a desired temperature of the component 106 in the loaded state. In the loaded state, the laser-emitting device 102 again emits the laser beam 104 onto the component, and the camera 112 acquires one or more images of the laser energy interacting with the component 106 in the loaded state. The images of the component 106 in the neutral state and the loaded state are compared to determine irregularities on and/or within the component 106.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the heating control unit 130 may be or include one or more processors that are configured to control operation thereof, as described herein.

The heating control unit 130 is configured to execute a set of instructions that are stored in one or more data storage units or elements (such as one or more memories), in order to process data. For example, the heating control unit 130 may include or be coupled to one or more memories. The data storage units may also store data or other information as desired or needed. The data storage units may be in the form of an information source or a physical memory element within a processing machine.

The set of instructions may include various commands that instruct the heating control unit 130 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the heating control unit 130. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the heating control unit 130 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
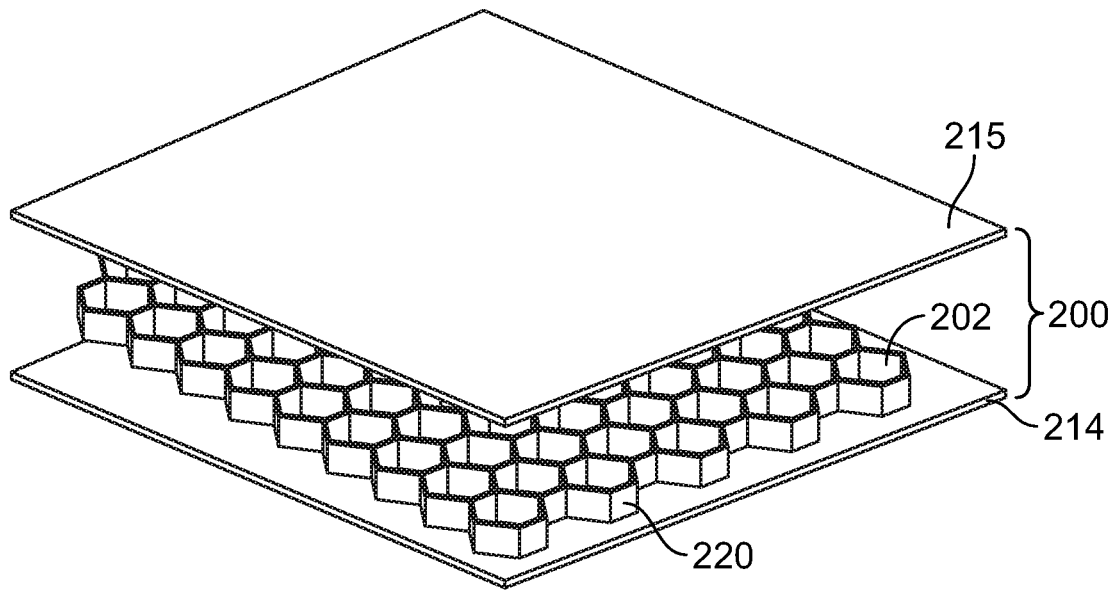
FIG. 2 illustrates a perspective exploded view of the composite panel assembly, according to an embodiment of the present disclosure.

FIG. 2 illustrates a perspective exploded view of a composite panel assembly 200, according to an embodiment of the present disclosure. The composite panel assembly 200 is an example of the component 106, shown in FIG. 1. The composite panel assembly 200 includes a honeycomb core 202 sandwiched between an inner skin 214 and an outer skin 215. In at least one embodiment, the core 202 includes a plurality of interconnected honeycomb cells 220. In at least one other embodiment, the core 202 may be a solid layer or porous foam layer. The core 202 may be formed of aramid fibers, and/or polyamides, for example. The inner skin 214 and the outer skin 215 may be or include one or more pre-impregnated epoxy resin layers that include fibers, such as fiberglass, graphite, Kevlar, and/or the like. The inner skin 214 and the outer skin 215 may be identical to one another. In at least one other embodiment, the inner skin 214 and the outer skin 215 may include more or less layers than one another.

As shown, the composite panel assembly 200 is a composite sandwich panel assembly. Optionally, the composite panel assembly 200 may not include a honeycomb core. In at least one other embodiment, the panel assembly may be metallic. That is, the composite panel assembly 200 shown and described with respect to FIG. 2 is merely an example of a panel assembly. Embodiments of the present disclosure may be used with various other types of panels and assemblies.

Figure 3:
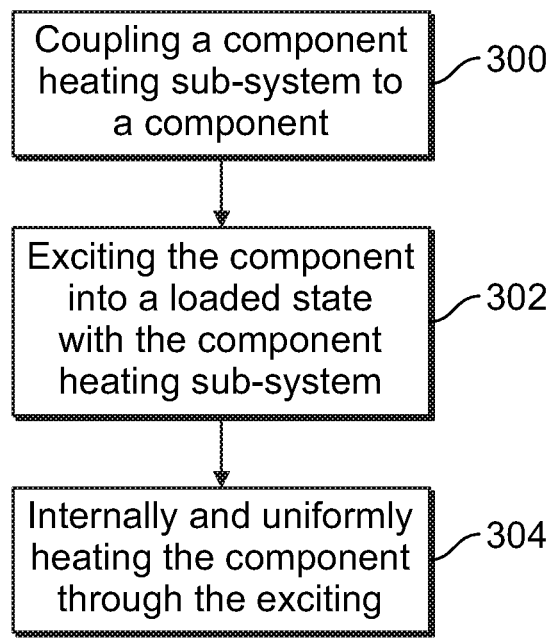
FIG. 3 illustrates a flow chart of a laser shearography testing method for non-destructively testing a component, according to an embodiment of the present disclosure.

FIG. 3 illustrates a flow chart of a laser shearography testing method for non-destructively testing a component, according to an embodiment of the present disclosure. The laser shearography testing method includes coupling (300) a component heating sub-system to a component, exciting (302) the component into a loaded state with the component heating sub-system (wherein the exciting includes passing an electric current through the component), and internally and uniformly heating (304) the component through the exciting (302) due to a resistivity of the component.

In at least one embodiment, the laser shearography testing method includes emitting a laser beam onto the component by a laser-emitting device, passing the laser beam emitted by the laser-emitting device through a beam expander before impinging on the component, acquiring at least one first image 119 (shown in FIG. 1) of the component in a neutral state in which the component is not excited by the component heating sub-system, and acquiring at least one second image 121 (shown in FIG. 1) of the component in the loaded state.

In at least one embodiment, the coupling includes coupling a power source to the component. For example, the coupling includes extending a first lead from the power source to a first portion of the component, and extending a second lead from a second portion of the component to the power source.

In at least one embodiment, the laser shearography testing method includes operatively coupling a heating control unit to a power source, communicatively coupling one or more heat sensors coupled to the component with the heating control unit, and selectively activating the power source in order to selectively pass the electric current through the component.

As described herein, embodiments of the present disclosure provide component heating sub-systems and methods for laser shearography testing systems that provide for increased detection of irregularities due to uniform and consistent excitation (that is, heating) of components being tested. The component heating sub-systems and methods provide uniform excitation (that is, heating) of the component, and eliminate, minimize, or otherwise potential damage of the components. Further, the component heating sub-systems are light, portable, and easy to set up, as compared to using separate and distinct surface heaters.

Embodiments of the present disclosure provide systems and methods for uniformly and safely heating an object during a laser shearography test. Further, embodiments of the present disclosure provide systems and methods for heating an object that reduce a potential of damage to the object during a laser shearography test. Further, embodiments of the present disclosure provide systems and methods that increase detection probability of far field irregularities by providing uniform excitation across an inspected part.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A laser shearography testing system for non-destructively testing a component, the laser shearography testing system comprising:
a component heating sub-system coupled to the component, wherein the component heating sub-system excites the component into a loaded state by passing an electric current through the component, wherein a resistivity of the component causes the component to internally and uniformly heat as the electric current passes through the component, wherein the component heating sub-system comprises one or more heat sensors mounted on an outer surface of the component or embedded within the component.

2. The laser shearography testing system of claim 1, further comprising a laser-emitting device that is configured to emit a laser beam onto the component.

3. The laser shearography testing system of claim 2, further comprising a beam expander, wherein the laser beam emitted by the laser-emitting device passes through the beam expander before impinging on the component.

4. The laser shearography testing system of claim 2, further comprising a camera that acquires at least one first image of the component in a neutral state, in which the component is not excited by the component heating sub-system, and at least one second image of the component in the loaded state.

5. The laser shearography testing system of claim 4, further comprising an image shearing device disposed between the component and the camera.

6. The laser shearography testing system of claim 1, wherein the component heating sub-system comprises a power source coupled to the component.

7. The laser shearography testing system of claim 6, wherein the component heating sub-system further comprises:
a first lead that extends from the power source and couples to a first portion of the component; and
a second lead that extends from a second portion of the component and couples to the power source.

8. The laser shearography testing system of claim 1, wherein the component heating sub-system comprises a heating control unit that is operatively coupled to a power source, wherein the heating control unit selectively activates the power source in order to selectively pass the electric current through the component.

9. A laser shearography testing method for non-destructively testing a component, the laser shearography testing method comprising:
coupling a component heating sub-system to a component;
communicatively coupling one or more heat sensors coupled to the component with the heating control unit, wherein the one or more heat sensors are mounted on an outer surface of the component or embedded within the component;
exciting the component into a loaded state with the component heating sub-system, wherein the exciting comprises passing an electric current through the component; and
uniformly heating an internal region of the component through the exciting due to a resistivity of the component.

10. The laser shearography testing method of claim 9, further comprising emitting a laser beam onto the component by a laser-emitting device.

11. The laser shearography testing method of claim 10, further comprising passing the laser beam emitted by the laser-emitting device through a beam expander before impinging on the component.

12. The laser shearography testing method of claim 10, further comprising:
acquiring at least one first image of the component in a neutral state in which the component is not excited by the component heating sub-system; and
acquiring at least one second image of the component in the loaded state.

13. The laser shearography testing method of claim 12, further comprising disposing an image shearing device between the component and a camera that acquires the at least one first image and the at least one second image.

14. The laser shearography testing method of claim 9, wherein the coupling comprises coupling a power source to the component.

15. The laser shearography testing method of claim 14, wherein the coupling further comprises:
extending a first lead from the power source to a first portion of the component; and
extending a second lead from a second portion of the component to the power source.

16. The laser shearography testing method of claim 9, further comprising:
operatively coupling a heating control unit to a power source;
selectively activating the power source in order to selectively pass the electric current through the component.

17. A laser shearography testing system for non-destructively testing a component, the laser shearography testing system comprising:
a laser-emitting device that is configured to emit a laser beam onto the component;
a beam expander, wherein the laser beam emitted by the laser-emitting device passes through the beam expander before impinging on the component;
a camera that acquires at least one first image of the component in a neutral state, in which the component is not excited, and at least one second image of the component in a loaded state; and
a component heating sub-system coupled to the component, wherein the component heating sub-system excites the component into the loaded state by passing an electric current through the component, wherein a resistivity of the component causes the component to internally and uniformly heat as the electric current passes through the component, wherein the component heating sub-system further comprises:

a first lead that extends from a power source and couples to a first portion of the component;

a second lead that extends from a second portion of the component and couples to the power source;

a heating control unit that is operatively coupled to the power source, wherein the heating control unit selectively activates the power source in order to selectively pass the electric current through the component; and one or more heat sensors coupled to the component.

18. The laser shearography testing system of claim 17, wherein the one or more heat sensors are mounted on an outer surface of the component.

19. The laser shearography testing system of claim 17, wherein the one or more heat sensors are embedded within the component.

20. The laser shearography testing system of claim 17, further comprising an image shearing device disposed between the component and the camera.

* * * * *